United States Patent
Wu (10) Patent No.: US 9,553,733 B2
(45) Date of Patent: Jan. 24, 2017

(54) COMMUNICATION DEVICES FOR PROVIDING MULTIMEDIA BROADCAST/MULTICAST SERVICES

(71) Applicant: HTC Corporation, Taoyuan, Taoyuan County (TW)

(72) Inventor: Chih-Hsiang Wu, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 357 days.

(21) Appl. No.: 14/245,690

(22) Filed: Apr. 4, 2014

(65) Prior Publication Data

US 2014/0219160 A1 Aug. 7, 2014

Related U.S. Application Data

(62) Division of application No. 13/045,158, filed on Mar. 10, 2011, now Pat. No. 8,750,191.

(60) Provisional application No. 61/315,236, filed on Mar. 18, 2010, provisional application No. 61/313,404, filed on Mar. 12, 2010.

(51) Int. Cl.
  *H04L 12/18* (2006.01)
  *H04W 48/12* (2009.01)
  *H04W 4/06* (2009.01)
  *H04W 68/12* (2009.01)

(52) U.S. Cl.
  CPC .......... *H04L 12/1845* (2013.01); *H04W 48/12* (2013.01); *H04W 4/06* (2013.01); *H04W 68/12* (2013.01)

(58) Field of Classification Search
  None
  See application file for complete search history.

(56) References Cited

U.S. PATENT DOCUMENTS

| 7,535,882 B2 | 5/2009 | Kim |
| 7,970,935 B2* | 6/2011 | Yanagihara ............ H04L 45/48 370/256 |
| 8,148,568 B2 | 4/2012 | Lopp et al. |
| 2004/0266440 A1* | 12/2004 | Fuchs ................. H04L 12/1836 455/445 |
| 2005/0147127 A1 | 7/2005 | Putcha et al. |
| 2005/0201296 A1 | 9/2005 | Vannithamby et al. |
| 2006/0146824 A1 | 7/2006 | Miyata |

(Continued)

FOREIGN PATENT DOCUMENTS

| EP | 1056306 A | 11/2000 |
| EP | 1507423 A1 | 2/2005 |

(Continued)

OTHER PUBLICATIONS

3GPP TSG-RAN WG2 Meeting #69; Feb. 22-26, San Francisco, USA; pp. 1-8, Mar. 2010.

(Continued)

*Primary Examiner* — Anh Ngoc Nguyen
(74) *Attorney, Agent, or Firm* — Birch, Stewart, Kolasch & Birch, LLP (57) ABSTRACT

Communication devices and methods thereof are provided. In one embodiment, the method comprises the communication device receiving information from one of a first carrier which indicates a second carrier carries a point-to-multipoint data, and the communication device determining to receive the point-to-multipoint data according to the received information.

4 Claims, 6 Drawing Sheets

(56) References Cited

U.S. PATENT DOCUMENTS

| | | | |
|---|---|---|---|
| 2007/0191006 A1 | 8/2007 | Carpenter | |
| 2008/0089263 A1 | 4/2008 | Tsutsumi | |
| 2008/0130595 A1 | 6/2008 | Abdel-Kader | |
| 2009/0252165 A1 | 10/2009 | Zhang et al. | |
| 2010/0075658 A1* | 3/2010 | Hou .................. | H04W 48/02 455/422.1 |
| 2011/0125887 A1* | 5/2011 | Hadas ................ | H04L 65/4076 709/223 |

FOREIGN PATENT DOCUMENTS

| | | |
|---|---|---|
| GB | 2418568 A | 3/2006 |
| WO | WO 98/10604 A1 | 3/1998 |
| WO | WO 2008/042225 A2 | 4/2008 |
| WO | WO 2009/070096 A1 | 6/2009 |

OTHER PUBLICATIONS

3GPP TSG-RAN WG2 Meeting #69; San Francisco, U.S.A., Feb. 22-26, 2010; pp. 1-17.
ETSI TS 136 304 v9.1.0 (Feb. 2010); LTE; Evolved Universal Terrestrial Radio Access (E-UTRA); User Equipment (UE) procedures in idle mode (3GPP TS 36.304 version 9.1.0 Release 9); pp. 1-32.
ETSITS136331 v9.1.0 (Feb. 2010); LTE; Evolved Universal Terrestrial Radio Access (E-UTRA); Radio Resource Control (RRC); Protocol specification (3GPP TS 36.331 version 9.1.0 Release 9); pp. 1-234.
Nokia, "MBMS dedicated carrier and MBMS Control Plane design", 3GPP TSG-RAN WG2 Ad-hoc on LTE, R2-061844, Cannes, France, Jun. 27-30, 2006, 6 pages.

* cited by examiner

COMMUNICATION DEVICES FOR PROVIDING MULTIMEDIA BROADCAST/MULTICAST SERVICES

CROSS REFERENCE TO RELATED APPLICATIONS

This application is a divisional application of U.S. patent application Ser. No. 13/045,158 filed on Mar. 10, 2011, which claims the benefit of U.S. Provisional Application No. 61/313,404 and 61/315,236, filed on Mar. 12, 2010 and Mar. 18, 2010 respectively, the entirety of which is incorporated by reference herein.

BACKGROUND OF THE INVENTION

Field of the Invention

The disclosure relates generally to data transmission with multiple carriers, and, more particularly to communication devices capable of providing multimedia broadcast/multicast services (MBMS) and unicast services with multiple carriers and methods thereof.

Description of the Related Art

In many communication systems, receivers may receive unicast, broadcast, or multicast data transmissions. For example, Multimedia Broadcast and Multicast Service (MBMS) is a service in which base stations transmit information of general interest on a commonly used channel, so that mobile devices that subscribe to the services can access the MBMS channel to obtain the service of interest, such as daily news or baseball game scores.

A Long Term Evolution (LTE) system is an evolved next-generation wireless communication system proposed by the Third Generation Partnership Project (3GPP). The LTE system provides high-speed low-latency packet-based communications at a data rate of up to 100 Mbps. The LTE system includes an Evolved Universal Terrestrial Radio Access Network (EUTRAN) having a plurality of evolved Node-Bs (eNBs), which communicate wirelessly with a plurality of user equipment (UEs) though uplink and downlink radio channels. The eNB may control a cell or a plurality of cells. An cell only broadcasting the MBMS is referred to as an MBMS only cell, a carrier originating from the MBMS only cell is referred to as an MBMS only component carrier.

A legacy UE compliant with older versions and including 3GPP release 9 only acquires data services from a single carrier; thus, the legacy UE cannot receive other types of data services upon camping onto the MBMS only component carrier. Whereas a UE compliant with versions after 3GPP release 9 supports multiple component carriers, capable of receiving data services from other component carriers when obtaining the MBMS from the MBMS only component carrier. Thus, communication devices capable of acquiring the MBMS according to the MBMS supportability of base stations and methods thereof are in need.

BRIEF SUMMARY OF THE INVENTION

An embodiment of a communication device is disclosed, comprising a control module and a communication module. The control module configures the communication module to receive a first data service on a first carrier. The communication module, coupled to the control module, receives information indicating whether the second carrier carries point-to-multipoint data.

Another communication device is provided, comprising a control module and a communication module. The communication module receives information from a first carrier which indicates a second carries a point-to-multipoint data, and determines whether to receives the point-to-multipoint data according to the received information.

Yet another embodiment of a communication device is shown, comprising a memory module, a control module, and a communication module. The memory module stores a first geographical information when the first geographical information represents first location of the communication device in the point-to-point data service. The control module, coupled to the memory module, discards a second geographical information when the first geographical information represents second location of the communication device in the point-to-multipoint data service. The communication module, coupled to the memory module and the control module, receives a point-to-multipoint data.

Another communication device is described, comprising a control module and a communication module. The communication module receives a service provider identifier identifying a service provider of a point-to-multipoint service, and receives a point-to-multipoint data when the service provider identifier is valid. The control module, coupled to the communication module, processes the point-to-multipoint data for playback.

Still another embodiment of a method for a communication device is provided, comprising the communication device receiving information from a first carrier which indicates a second carrier carries a point-to-multipoint data, and the communication device determining whether receiving the point-to-multipoint data according to the received information.

Still yet another embodiment of a method for a communication device is provided, comprising a communication device receiving a point-to-multipoint data from a base station when the base station is only capable of providing a point-to-multipoint data service and the base station is invalid.

Another embodiment of a method for a communication device is disclosed, comprising a communication device storing a first geographical information when the first geographical information represents first location of the communication device in the point-to-point data service, the communication device discarding a second geographical information when the first geographical information represents second location of the communication device in the point-to-multipoint data service, and the communication device receiving a point-to-multipoint data.

Yet another embodiment of a method for a communication device is disclosed, comprising a communication device receiving a service provider identifier identifying a service provider of a point-to-multipoint service, and the communication device receiving a point-to-multipoint data when the service provider identifier is valid.

BRIEF DESCRIPTION OF THE DRAWINGS

The invention will become more fully understood by referring to the following detailed description with reference to the accompanying drawings, wherein.

DETAILED DESCRIPTION OF THE INVENTION

Figure 1:
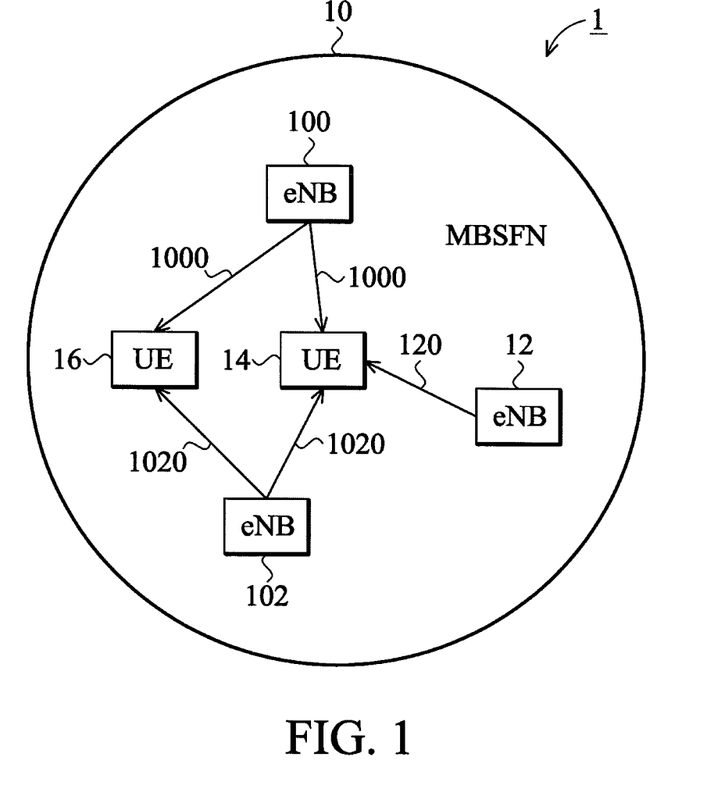
FIG. 1 is a block diagram of an exemplary network in an LTE system, incorporating a user equipment (UE) 14 in accordance with the present invention.

FIG. 1 is a block diagram of an exemplary Evolved Universal Terrestrial Radio Access Network EUTRAN 1 in an LTE system, incorporating a user equipment (UE) 14 in accordance with the present invention. The EUTRAN 1 comprises cells 100 and 102 capable of providing a point-to-multipoint data service, and an cell 12 capable of providing only a point-to-multipoint data service. Each cell comprises at least one radio transmitter, receiver, control section, power supply, and an antenna system, e.g., a radio tower, building, and base station. The base station is a part of telecommunication network comprising a radio access network (RAN) coupled to one or more core networks (CN). The radio access network may be a first, second or third generation network such as a Global System for Mobile Communications (GSM) or Universal Mobile Telecommunications System (UMTS), coupled to a packet data network and circuit switched core networks. The cells 100 and 102 provide a point-to-multipoint data service such as Broadcast/Multicast Service in 3GPP2, Multimedia Broadcast/Multicast Service MBMS in 3GPP, or other broadcasting technologies, where data are transmitted to multiple network recipients concurrently. The cell 12 provides a point-to-point data service such as voice, multimedia, messaging, application data, and other unicast services, where data are transmitted to a single network destination identified by a unique network address.

In a Multimedia Broadcast over Single Frequency Network (MBSFN) 10, a time-synchronized multimedia broadcast data service such as Mobile TV is transmitted from a plurality of the cells 100 and 102 using the same set of resource blocks including transport carrier frequencies and transport intervals, so that the UEs 14 and 16 within the coverage of the MBSFN 10 can treat the multi-cell broadcast transmission in the same way as a single large cell broadcast transmission, with multipath effects. The cell 12 communicates with the UE 14 through uplink and downlink radio channels through a plurality of carrier frequencies. The UEs 14 and 16 receive MBMS from cells 100 and 102 via carrier frequencies 1000 and 1020 and unicast data services from the cell 12 via a carrier 120. The carrier frequencies are referred to as Components Carriers (CC) in the LTE technology. Both MBMS transmissions on the component carriers 1000 and 1020 are available to the UE 14.

The UEs 14 and 16 are any device used directly by an end-user for communications, e.g., handhold mobile phones, laptop equipped with broadband network adaptors, or any other device capable of communicating. The UE 14 is capable of receiving the point-to-multipoint data service and the point-to-point data service concurrently on multiple carrier signals, and aggregating several carrier signals to increase bandwidth of data transmission up to 100 MHz, is referred to as Carrier Aggregation (CA). The UE 14 comprises a baseband module (not shown) and a radio frequency (RF) module (not shown). The baseband module may comprise hardware to perform baseband signal processing including digital signal processing, coding and decoding, and so on. The RF module may comprise hardware to perform analog to digital conversion (ADC), digital to analog conversion (DAC), gain adjusting, modulation, demodulation, and so on. The RF module may receive RF signals from the cell 120 and 122 and down-convert the received RF wireless signals to baseband signals to be processed by the baseband unit, or receive baseband signals from the baseband unit up-convert the received baseband signals to RF wireless signals for uplink transmission. The RF module may comprise a mixer to up-convert the baseband signals with a component carrier signal oscillated at a radio frequency of the wireless communications system. The radio frequency may be 900 MHz, 1900 MHz, or 2100 MHz utilized in WCDMA systems, or may be 900 MHz, 2100 MHz, or 2.6 GHz utilized in LTE systems, or others depending on the radio access technology (RAT) in use. The UE 14 receives the downlink point-to-multipoint or point-to-point data on one or more component carriers.

In the LTE system, the logical connections between the UE 14 and the cells 100, 102, and 12 are determined by the radio resource control (RRC) connection states comprising an RRC idle mode and an RRC connected mode. In the RRC idle mode, the communication device UE 14 has no connection to the cells, and can establish an RRC connection therebetween to enter the RRC connected mode when necessary. In the RRC procedures, radio bearers (RBs) including data RBs (DRBs) and signaling RBs (SRBs) are generated or released. Through use of the SRBs, the cells can exchange RRC messages for radio resource settings including a configuration of component carriers. After establishing the RRC connection, the UE 14 receives the configuration to configure the component carriers to receive the unicast data.

Prior to acquiring the MBMS from the MBSFN 10, the UEs 14 and 16 obtain limited MBMS control information on a Broadcast Control Channel (BCCH) to configure a Multicast Control Channel (MCCH), which carries MBMS control information that the communication device can use to obtain the MBMS user data in a Multicast Transport Channel (MTCH). The limited MBMS control information on the BCCH for the MCCH configuration is defined in SystemInformationBlockType13. The MBMS control information is broadcasted in the MBSFN periodically using a configurable repetition period defined in the SystemInformationBlockType13. The MBSFN 10 periodically provides Dynamic Scheduling Information (DSI) at a Media Access Control (MAC) layer to indicate the sub-frames used for the MTCH, so that the UEs 14 and 16 can determine and retrieve an MBMS data service of interest accordingly.

Figure 2:
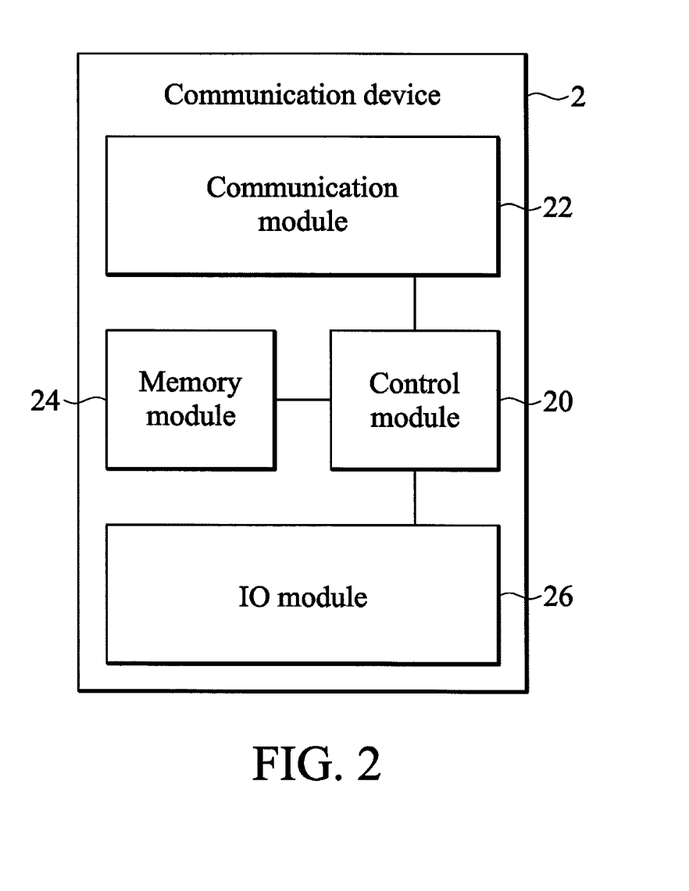
FIG. 2 is a block diagram of an exemplary communication device 2 according to the invention.

Referring to FIG. 2, illustrating a block diagram of an exemplary communication device 2 according to the invention, incorporated as the UE 14 in FIG. 1. The communication device 2 comprises a control module 20, a communication module 22, a memory module 24, and an IO module 26. The communication module 22, the memory module 24, and the IO module 26 are all coupled to the control module 20.

The communication module 22 comprises at least one transmitter (not shown) and at least one receiver (not shown), capable of receiving transmission on multiple component carriers. The receiver receives a configuration comprising information of the component carriers after establishing the RRC connection, so that the control module 20 can configure the at least one receiver to receive data services on the component carriers 1000, 1020, and 120 from the cells 100, 102 and 12 respectively. The EUTRAN 1 may transmit the MBMS data on some of the component carriers in the received configuration. In one embodiment of the invention, the communication device 2 receives information on the MBMS supportability of the available component carriers (a plurality of carriers) and only receives the MBMS data from the component carriers that provide the MBMS data by selecting the component carrier indicated in the received information. The communication module 22 receives information indicating whether the component carriers 1000, 1020, and 120 carry the MBMS data. The information may be included in the system information on the BCCH to be broadcasted on the component carriers 1000 or 1002 or to be transmitted by the component carrier 120 carrying the unicast data dedicated only to the communication device 2. The control module 20 determines whether the component carriers 1000, 1020, and 120 carry the MBMS data, so that the communication device 2 interested in the MBMS can receive the MBMS data only from the component carriers 1000 and 1020 that carry the MBMS data. In the example in FIG. 1, the control module 20 determines that the component carriers 1000 and 1020 that carry the MBMS data based on the received information, and turns on the corresponding receivers to obtain the MBMS data. The received MBMS data can be stored in the memory module 24. The control module 20 then processes the MBMS data for playback on the IO module 26 such as an LCD or LED display. The playback operation comprises displaying text or image data on the IO module 26, or playing video or audio multimedia data. In one embodiment, the communication device 2 is capable of receiving data services from multiple component carriers; thus, the control module 20 turns on the at least one receiver corresponding to the component carriers carrying the MBMS data for data retrieval. In another embodiment, the communication device 2 only supports single component carrier; thus, the control module 20 determines that only one component carrier will carry the MBMS data and configures the communication module 22 to receive the MBMS data from the determined component carrier, i.e. one of the component carriers 1000 and 1020.

In the present embodiment, the communication device 2 receives the information of the MBMS supportability of the component carriers, thereby determining that the component carriers carrying the MBMS data for data retrieval. The communication device 2 interested in the MBMS camps only on the component carriers that provide the MBMS, resulting in increased MBMS data retrieval.

The EUTRAN 1 also broadcasts control information relevant to the cell access right of the UE in SystemInformationBlockType1 and other control information on the BCCH. A cell is regarded by the UE as invalid when a cell status of the cell is set as barred in the SystemInformationBlockType1 or a predetermined control information is missing. The cell status is set as barred when a cellBarred parameter is set as barred or a cellReservedForOperatorUse parameter is reserved in the SystemInformationBlockType1. In one embodiment, the communication module 22 receives the control information on the BCCH and the control module 20 determines whether the cell has been barred according to the received control information. The control module 20 may determine that the cell has been barred when the cellBarred parameter is set as barred or a cellReservedForOperatorUse parameter as reserved in SystemInformationBlockType1. The control module 20 may also determine that the cell has been barred when a number of the control information on the BCCH is less than a predetermined number of the control information. For example, the UE 14 expects to receive MasterInformationBlock, SystemInformationBlockType1, and SystemInformationBlockType2 on the BCCH. The control module 20 determines that the cell has been barred when the communication module 22 only retrieves none or a part of the MasterInformationBlock, SystemInformationBlockType1, and SystemInformationBlockType2 control information on the BCCH, i.e., the predetermined number of the control information is 3, and the eNB has been barred when the received control information number is less than 3. The EUTRAN 1 may further broadcast control information indicating that the cell is only capable of providing the MBMS data in the MasterInformationBlock, SystemInformationBlockType1, SystemInformationBlockType2, or other control information on the BCCH. A UE supporting 3GPP standards before a certain release (e.g. release 10) recognizes that the cells 100 and 102 are barred, so that the cells 100 or 102 are not selected. On the contrary, the communication device 2 in the present invention continues to retrieve the MBMS data from the cells 100 or 102 only being capable of providing the MBMS data. The communication module 22 receives the MBMS data from the cells 100 or 102 when the cells 100 or 102 are only capable of providing the MBMS. The received MBMS data can be stored in the memory module 24. The control module 20 then processes the MBMS data for playback on the IO module 26 such as an LCD or LED display.

In the presenting embodiment, the communication device 2 continues to acquire the MBMS from the MBMS only base stations, when the communication devices compliant with 3GPP releases before the certain release are prevented from camping on the component carriers only supporting the MBMS.

Figure 3:
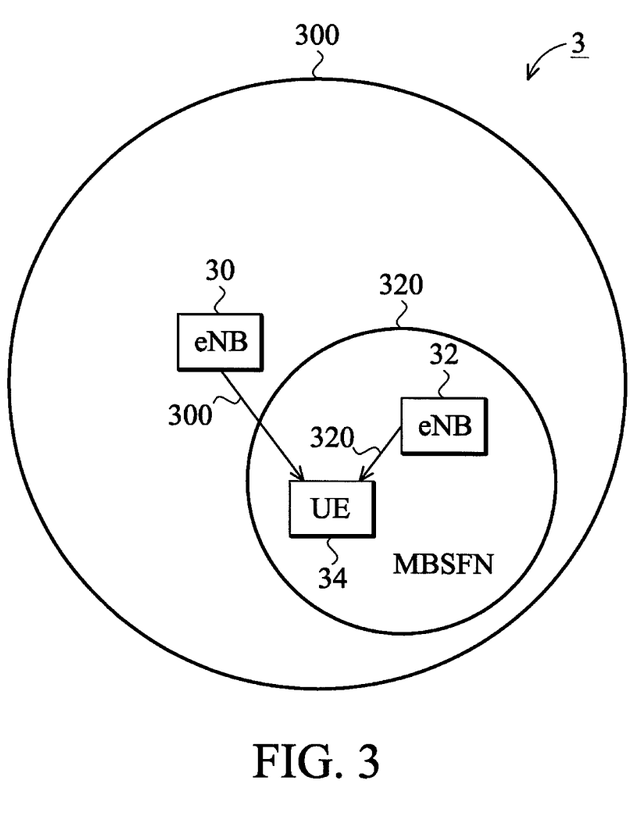
FIG. 3 depicts another exemplary access network in the LTE system, incorporating a UE 34 in accordance with the present invention.

FIG. 3 depicts another exemplary EUTRAN 3 in the LTE system, comprising cells 30 and 32. A MBSFN 320 comprises the cell 32 providing the MBMS. The cell 30 provides a unicast service within a unicast coverage 300, where a part of the unicast coverage 300 is overlapped with the coverage of the MBSFN 320. A UE 34 receives a downlink broadcast transmission 320 from the cell 32 and a downlink unicast transmission 300 from the cell 30. The EUTRAN 3 incorporates the communication device 2 in the FIG. 2 as an embodiment of the UE 34.

When entering the unicast coverage 300 and the MBMS coverage 320 area, the UE 34 is registered to specific tracking area codes (TAC) corresponding to location of the UE 34 in the unicast network and the MBMS network. The UE 34 is registered in Mobility Management Entity (MME, not shown) coupled to the cells 30 and 32 respectively. The tracking area code represents a geographical area in the network, such as the unicast network or the MBMS network. A Mobility Management Entity (MME, not shown) in the EPC initiates a paging procedure by sending a PAGING message to each eNB with cells belonging to the tracking area in which the UE is registered. The UE 34 registered to a tracking area does not need to trigger a tracking area update so long as it remains in the tracking area; otherwise, the UE 34 is required to perform a tracking area update so that the EPC can track the UE 34 in the updated tracking area.

In one embodiment, the communication module 22 receives a first geographical information representing a location of the communication device in the point-to-point data service from the cell 30 and a second geographical information representing a second location of the communication device in the point-to-multipoint data service from the cell 32. The first geographical information is the tracking area code of the cell 30 that provides the unicast data service, and the second geographical information is the tracking area code of the cell 32 that provides the MBMS data service. The tracing area code of the cell 30 is then stored in the memory module 34, and the tracking area code of the cell 32 is discarded by the control module 20. The control module 20 stops updating the tracking area when the communication module 22 receives the second tracking area code. The geographical information may be a public land mobile network (PLMN) identifier identifying a service provider of the data service.

In the present embodiment, the communication device 2 ignores the tracking are code or the PLMN identity of the MBMS only cell, so that the communication device 2 stops switching the tracking area codes or the PLMN identities between the two networks (the MBMS and the unicast data network).

In another embodiment, the communication module 22 receives a service provider identifier identifying a service provider of a MBMS, and receives the MBMS data only when the service provider identifier is valid. The service provider identifier may be the PLMN identifier, an equivalent service provider equivalent to the service provider, or an associated service provider associated with the service provider. The control module 20 determines whether the PLMN identifier is valid and processes the MBMS data to be played back on the 10 module 26 only when the PLMN identifier is valid.

In the present embodiment, the communication devices determine the validity of the PLMN identifier before retrieving the MBMS data from the valid MBSFN, thereby reducing power usage when retrieving invalid MBMS data.

Figure 4:
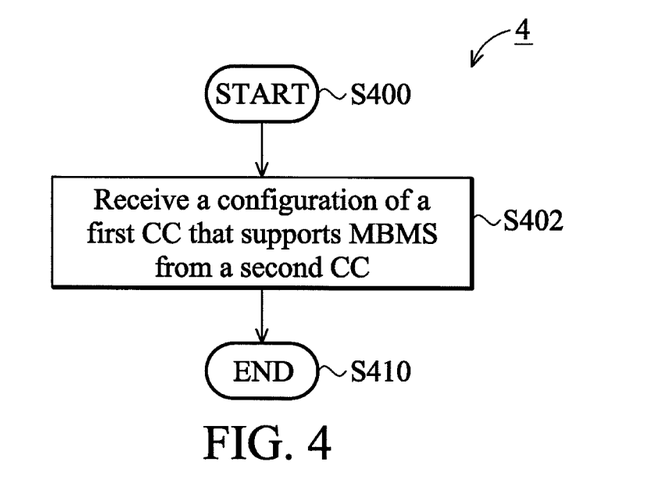
FIG. 4 is a flowchart of an exemplary method of a communication device according to the invention, incorporating the communication device 2 in FIG. 2.

FIG. 4 is a flowchart of an exemplary method of a communication device according to the invention, incorporating the communication device 2 in FIG. 2.

In step S400, the communication device 2 is initiated to perform the telecommunication method 4 to receive the MBMS.

In step S402, the communication module 22 receives a configuration of a first component carrier supporting MBMS from a second component carrier, so that the control module 20 can configure the communication module 22 to receive MBMS data services on the first component carrier according to the received configuration.

Figure 5:
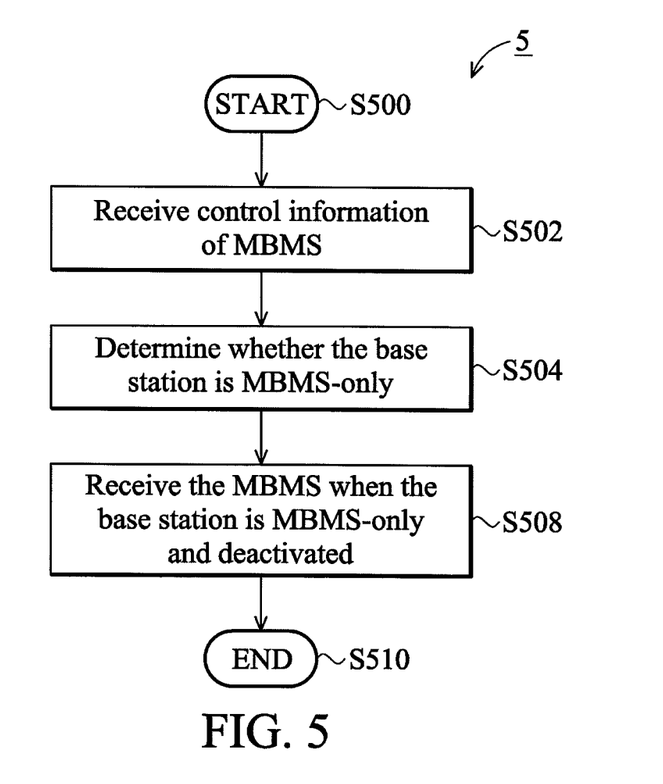
FIG. 5 is a flowchart of another exemplary method of a communication device according to the invention, incorporating the communication device 2 in FIG. 2.

FIG. 5 is a flowchart of another exemplary method of a communication device according to the invention, incorporating the communication device 2 in FIG. 2.

In step S500, the communication device 2 is initiated to perform the telecommunication method 5 to receive the MBMS.

In step S502, the communication module 22 receives control information of MBMS. The control information is broadcasted in the BCCH, indicating that a cell provides only the MBMS.

In step S504, based on the control information, the control module 20 determines whether the cell is MBMS-only, i.e., only provides the MBMS data.

In step S508, the communication module 22 receives the MBMS when the cell is MBMS-only cell. The UE supporting multiple carriers in the present invention continues to retrieve the MBMS data.

In step S510, the telecommunication method 5 is completed and exited.

Figure 6:
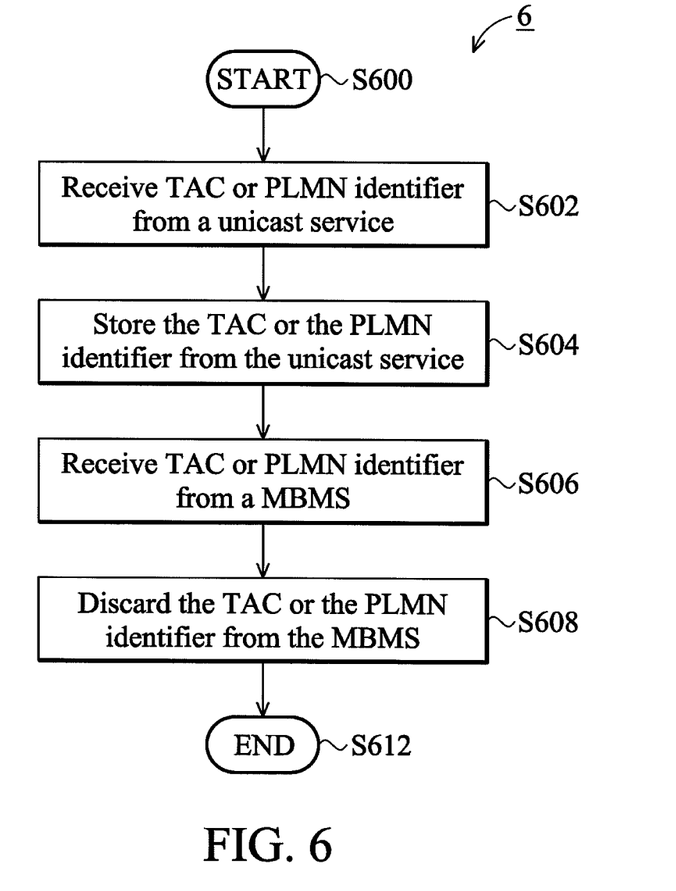
FIG. 6 is a flowchart of yet another exemplary method of a communication device according to the invention, incorporating the communication device 2 in FIG. 2.

FIG. 6 is a flowchart of yet another exemplary method of a communication device according to the invention, incorporating the communication device 2 in FIG. 2.

In step S600, the communication device 2 is initiated to perform the telecommunication method 6 to receive the MBMS.

In step S602, the communication module 22 receives a first TAC or first PLMN identifier from a first cell providing a unicast service.

In step S604, the control module 20 stores the first TAC or the first PLMN identifier from the first cell in the memory module 24, so that the communication device 2 can update tracking area corresponding to the unicast service when moving to another geographical area corresponding to a different TAC.

In step S606, the communication module 22 also receives a second TAC or second PLMN identifier from a second cell providing a MBMS.

In step S608, the control module 20 discards the second TAC or the second PLMN identifier from the second cell, so that the communication device 2 does not have to switch between the two TACs or the PLMN identifiers corresponding to the unicast service and the MBMS. By discarding the second TAC or the second PLMN identifier, the communication module 22 receives the MBMS data without ever performing tracking area updating procedure.

In step S612, the telecommunication method 6 is completed and exited.

Figure 7:
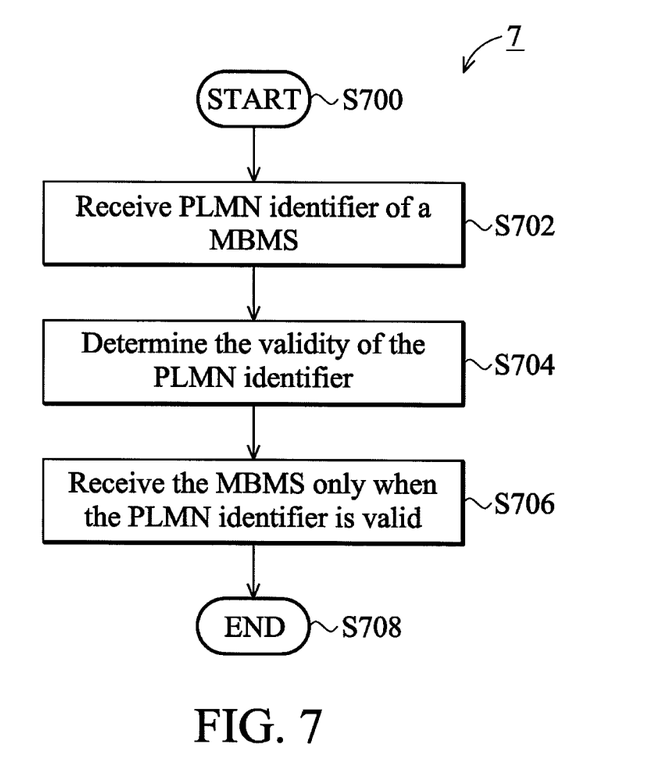
FIG. 7 is a flowchart of still another exemplary method of a communication device according to the invention, incorporating the communication device 2 in FIG. 2.

FIG. 7 is a flowchart of still another exemplary method of a communication device according to the invention, incorporating the communication device 2 in FIG. 2.

In step S702, the communication module 22 receives a first PLMN identifier of a MBMS. The first PLMN identifier may also be equivalent to a second PLMN identifier the communication device registers, or an associated service provider identifier associated with the second PLMN identifier.

In step S704, the control module 20 determines the validity of the first PLMN identifier.

In step S706, the communication module 22 receives the MBMS only when the PLMN identifier is valid.

In step S708, the telecommunication method 7 is completed and exited.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine.

The operations and functions of the various logical blocks, modules, and circuits described herein may be implemented in circuit hardware or embedded software codes that can be accessed and executed by a processor.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the invention shall be defined and protected by the following claims and their equivalents.

What is claimed is:

1. A method for a communication device comprising:
   receiving, by the communication device, a first geographical information from a first cell of a wireless communication system, the first geographical information representing a first location of the communication device in a point-to-point data service;
   storing, by the communication device, the first geographical information into a memory of the communication device;
   updating, by the communication device, the first geographical information while receiving further data in the point-to-point data service from the first cell of the wireless communication system;
   receiving, by the communication device, a second geographical information from a second cell of a wireless communication system, the second geographical information representing a second location of the communication device in a point-to-multipoint data service;
   discarding, by the communication device, the second geographical information, such that the communication device stops updating the second geographical information while receiving further data in the point-to-multipoint data service from the second cell of the wireless communication system; and
   receiving, by the communication device, a point-to-multipoint data without updating the second geographical information.

2. The method of claim 1, further comprising:
   receiving, by the communication device, a third geographical information representing a third location of the communication device in the point-to-point data service; and
   updating, by the communication device, the first geographical information by the third geographical information.

3. A communication device, comprising:
   a communication module, configured to receive a first geographical information from a first cell of a wireless communication system, the first geographical information representing a first location of the communication device in a point-to-point data service, and configured to receive a second geographical information from a second cell of a wireless communication system, the second geographical information representing a second location of the communication device in a point-to-multipoint data service;
   a memory, configured to store the first geographical information; and
   a control module, configured to update the first geographical information while the communication module receives further data in the point-to-point data service from the first cell of the wireless communication system, and discard the second geographical information and stops updating the second geographical information while the communication module receives further data in the point-to-multipoint data service from the second cell of the wireless communication system.

4. The communication device of claim 3, wherein the communication module receives a third geographical information representing a third location of the communication device in the point-to-point data service and updates the first geographical information by the third geographical information.

* * * * *